US009446628B2

United States Patent
Bestgen

(10) Patent No.: US 9,446,628 B2
(45) Date of Patent: Sep. 20, 2016

(54) TIRE FOR TWO-WHEELED VEHICLES, INCLUDING A TREAD HAVING SIPES

(75) Inventor: Luc Bestgen, Chatel-Guyon (FR)

(73) Assignees: COMPAGNIE GENERALE DES ETABLISSEMENTS MICHELIN, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 420 days.

(21) Appl. No.: 13/578,716

(22) PCT Filed: Feb. 4, 2011

(86) PCT No.: PCT/EP2011/051638
§ 371 (c)(1),
(2), (4) Date: Oct. 23, 2012

(87) PCT Pub. No.: WO2011/098406
PCT Pub. Date: Aug. 18, 2011

(65) Prior Publication Data
US 2013/0206297 A1 Aug. 15, 2013

(30) Foreign Application Priority Data
Feb. 12, 2010 (FR) ..................... 10 50993

(51) Int. Cl.
*B60C 11/03* (2006.01)
*B60C 11/117* (2006.01)
(Continued)

(52) U.S. Cl.
CPC .......... *B60C 11/0327* (2013.04); *B60C 11/032* (2013.04); *B60C 11/0306* (2013.04);
(Continued)

(58) Field of Classification Search
CPC ............ B60C 11/0323; B60C 11/032; B60C 11/1272; B60C 11/1281; B60C 11/0332; B60C 11/12; B60C 11/117; B60C 2200/10
USPC ............ 152/209.11, 209.17, 209.18, DIG. 3, 152/209.5, 531, 902, 526
See application file for complete search history.

(56) References Cited

U.S. PATENT DOCUMENTS 2,298,033 A * 10/1942 Bowers ............... B60C 11/0306
152/209.17
3,556,190 A 1/1971 Riches
(Continued)

FOREIGN PATENT DOCUMENTS

EP 255815 2/1988
EP 561326 9/1993
(Continued)

OTHER PUBLICATIONS

Machine Translation: FR2548097A; Jubert D; no date.*
(Continued)

*Primary Examiner* — Michael H Wilson
*Assistant Examiner* — Kendra Ly
(74) *Attorney, Agent, or Firm* — Cozen O'Connor

(57) ABSTRACT

A tire for a motorized two-wheeled vehicle comprising a reinforcing structure of the carcass type, made up of reinforcing elements, anchored on each side of the tire to a bead the base of which is intended to be mounted on a rim seat, each bead being extended radially outwards by a sidewall, the sidewalls radially towards the outside joining to a tread comprising incisions. The length of the incisions is less than 1.2 times the width of the area of the contact patch and at least one incision has at least one end which ends in a cut in the tread the width of which is greater than 2.5 mm and the length of which is between 2.5 and 10 mm.

10 Claims, 2 Drawing Sheets

(51) Int. Cl.
*B60C 11/12* (2006.01)
*B60C 11/04* (2006.01)

(52) U.S. Cl.
CPC ............ *B60C11/04* (2013.01); *B60C 11/12* (2013.01); *B60C 11/1281* (2013.04); *B60C 2011/0374* (2013.04); *B60C 2011/1209* (2013.04); *B60C 2011/129* (2013.04); *B60C 2200/10* (2013.04)

(56) References Cited

U.S. PATENT DOCUMENTS

| | | | | |
|---|---|---|---|---|
| 4,140,168 | A | * | 2/1979 | Caretta .................... 152/527 |
| 4,683,928 | A | * | 8/1987 | Yahagi .................... 152/209.5 |
| 4,723,584 | A | * | 2/1988 | Yamaguchi et al. ..... 152/209.17 |
| 4,986,325 | A | * | 1/1991 | Matsumoto ......... B60C 11/0302 152/209.17 |
| 5,152,854 | A | | 10/1992 | Matsumoto |
| 5,178,699 | A | * | 1/1993 | Kakumu et al. ......... 152/209.18 |
| 5,358,020 | A | | 10/1994 | Haas |
| 2005/0018809 | A1 | | 1/2005 | Gibson et al. |
| 2010/0089511 | A1 | | 4/2010 | Terada |
| 2010/0180996 | A1 | | 7/2010 | Nakagawa |

FOREIGN PATENT DOCUMENTS

| | | | |
|---|---|---|---|
| EP | 2116395 | | 11/2009 |
| EP | 2123485 | | 11/2009 |
| FR | 2548097 | | 1/1985 |
| FR | 2548097 A * | | 1/1985 ............ B60C 11/10 |
| GB | 491139 | | 8/1938 |
| JP | 04274902 A * | | 9/1992 |
| JP | 2009101743 | | 5/2009 |
| WO | WO 2004/018236 | | 3/2004 |
| WO | WO 2008/149611 | | 12/2008 |

OTHER PUBLICATIONS

Summary: JP04274902A; Kodera, Takeshi; no date.*

* cited by examiner

TIRE FOR TWO-WHEELED VEHICLES, INCLUDING A TREAD HAVING SIPES

RELATED APPLICATIONS

This is a U.S. national stage of application No. PCT/EP2011/051638, filed on Feb. 4, 2011. Priority is claimed based on the following application: French Application No.: 10/50993 filed on Feb. 12, 2010, the content of which is hereby incorporated herein by reference.

FIELD OF THE INVENTION

The invention relates to a tire intended to be fitted to a vehicle and more particularly intended to be fitted to a two-wheeled vehicle such as a motorbike and, more specifically still, to a tire intended to be fitted to a motorbike with a speed rating higher than W which corresponds to a speed of 270 km/h.

Although not limited to such an application, the invention will be described more particularly with reference to such a motorcycle or motorbike tire.

BACKGROUND OF THE INVENTION

As with all other tires, motorbike tires too are going radial, the architecture of such tires comprising a carcass reinforcement made up of one or two layers of reinforcing elements which with the circumferential direction make an angle that may be between 65 and 90°, the said carcass reinforcement being radially surmounted by a crown reinforcement made up of reinforcing elements. However, some non-radial tires do still remain and the invention relates to these also. The invention further relates to tires which are partially radial, which means tires in which the reinforcing elements of the carcass reinforcement are radial over at least part of the said carcass reinforcement, for example in the part corresponding to the crown of the tire.

Numerous crown reinforcement architectures have been proposed, depending on whether the tire is intended to be fitted at the front of the motorbike or fitted at the rear. A first structure, for the said crown reinforcement, involves using only circumferential cords, and the said structure is more particularly used for rear tires. A second structure, inspired directly by the structures commonly used on passenger vehicle tires, has been used to improve resistance to wear, and involves using at least two working crown layers of reinforcing elements that are substantially parallel to one another within each layer but crossed from one layer to the next, making acute angles with the circumferential direction, such tires being more particularly suitable as front tires for motorbikes. The said two working crown layers may be combined with at least one layer of circumferential elements, generally obtained by helical winding of a strip of at least one rubber-coated reinforcing element.

The choice of tire crown architecture has a direct impact on certain properties of the tire, such a wear, endurance, grip or even drivability or, particularly in the case of motorbikes, stability. However, other tire parameters such as the nature of the rubber compounds of which the tread is made also have an impact on the properties of the said tire. The choice and nature of the rubber compounds of which the tread is made are, for example, essential parameters as far as wear properties are concerned. The choice and nature of the rubber compounds of which the tread is made also have an impact on the grip of the tire.

It is also known practice for other types of tire to produce treads comprising incisions, more particularly for tires intended to run on ground covered with snow, black ice, or wetness.

Such treads are usually provided with raised elements of the rib or block type, separated from one another in the circumferential direction and/or in the transverse direction by transverse and/or circumferential grooves. These treads then also comprise incisions or slits, the non-zero widths of which are very much smaller than those of the aforementioned grooves. By making a plurality of cuts that open onto the tread surface a plurality of rubber edges is created and these cut into the layer of water that may be present on the road surface in order to keep the tire in contact with the ground and create cavities that may potentially form ducts intended to collect the water present in the contact patch via which the tire makes contact with the road and remove if it they are configured in such a way as to open out outside the contact patch.

Numerous types of incision have already been proposed with a view to improving the grip of the tire on the surfaces in question.

Document FR 2 418 719 for example describes incisions which may be normal to the surface of the tread or inclined with respect to the direction perpendicular to the said surface.

Document FR 791 250 describes incisions that run in a wave along the surface of the tread.

Motorbike performance notably in terms of grip on wet road surfaces has led to proposing tires with treads comprising incisions to contribute towards improving the transfer of driving or braking torque and thus improving the ability of the motorbike to accelerate or to brake.

Tests conducted on tires comprising incisions made in the blocks of rubber material, which means to say between the various grooves present on the tread lead to improvements in terms of grip but, in comparison with the results obtained on tires which, for example, are intended to be fitted to motor cars, the improvement in terms of grip on wet ground is not as great.

SUMMARY OF THE INVENTION

It is therefore an object of the invention to provide a motorbike tire of which the properties, in terms of the grip on a wet surface are further improved.

This object has been achieved according to one aspect of the invention using a tire for a motorized two-wheeled vehicle comprising a reinforcing structure of the carcass type, made up of reinforcing elements, anchored on each side of the tire to a bead the base of which is intended to be mounted on a rim seat, each bead being extended radially outwards by a sidewall, the sidewalls radially towards the outside joining to a tread, the length of the incisions being less than 1.2 times the width of the surface of the contact patch and at least one incision having at least one end which ends in a cut in the tread the width of which is greater than 2.5 mm and the length of which is between 2.5 and 10 mm.

Within the meaning of the invention, an incision is a cut that forms two walls and in which the distance between the walls measured along the normal to a plane tangential to one of the walls is less than 1.5 mm and preferably less than 1 mm. The said distance on the surface of the tread is at least equal to the said distance at the bottom of the incision, which means to say at the point furthest from the surface of the tread. Particularly in the case of a motorbike tire, as the thickness of the tread is relatively small, any widening of the said distance from the surface of the tread towards the bottom of the incision cannot be allowed to exist in case it causes the edges of the incision to collapse at the surface of the tread thus reducing the area of the contact patch in which the tread makes contact with the ground.

The length of one incision is measured along the curved abscissa of one wall of the said incision.

The surface area of the contact patch is measured by compressing vertically, in a direction perpendicular to the axis of rotation of the tire (which means to say that the compression is done vertically with the wheel in a vertical plane), the tire mounted on the nominal rim recommended by the ETRTO, inflated to 2.5 bar on an unlubricated plate with a load corresponding to 60% of the load index (maximum recommended load) of the tire. The width of the surface of the tread in the contact patch is given by the greatest distance in the axial direction, the length being given by the greatest distance in the circumferential direction.

Within the meaning of the invention, the width of said cut is equal to the width of the rectangle circumscribing said cut, which means to say of the smallest rectangle capable of containing the said cut in its entirety.

Within the meaning of the invention, an end which ends in a cut in the tread of which the width is greater than 2.5 mm is considered to be open, which means to say an end of which the width between the ends of the walls does not correspond to a mass of rubber.

Advantageously according to one embodiment the invention, at least 25%, and preferably at least 50%, of the ends of the incisions end in a cut in the tread of which the width is greater than 2.5 mm.

Advantageously also according to an embodiment the invention, at least 25% of the ends of the incisions end in a cut in the tread of which the width is greater than 2.5 mm and of which the length is between 2.5 and 10 mm.

The longitudinal direction of the tire, or circumferential direction, is the direction corresponding to the periphery of the tire and defined by the direction of running of the tire.

The transverse or axial direction of the tire is parallel to the axis of rotation of the tire.

The axis of rotation of the tire is the axis about which it rotates in normal use.

A circumferential plane or a circumferential plane of section is a plane perpendicular to the axis of rotation of the tire. The equatorial plane is the circumferential plane that passes through the center or crown of the tread and is therefore in the central part of the tread.

A radial or meridian plane contains the axis of rotation of the tire.

The radial direction is a direction intersecting the axis of rotation of the tire and perpendicular thereto. The radial direction is the intersection between a circumferential plane and a radial plane.

Tests conducted on a tire produced in this way according to the invention and mounted on the wheel of a motorbike have actually demonstrated better performance in terms of grip than a tire comprising incisions of greater length.

The inventors have demonstrated that the complex shape of a motorbike tire and more particularly its very pronounced curvature leads to a phenomenon of significant double flexing centered on the edge of the contact patch. Specifically, at the edge of the contact patch there may be seen a curvature with a very small radius of curvature which connects the substantially flat surface of the contact patch to the profile of the tire of which the curvature in the meridian direction is great. The presence of this curvature with a very small radius of curvature actually leads to double flexing first with respect to the surface of the contact patch and secondly with respect to the curvature in the meridian direction of the tire. This phenomenon of double flexing at the edge of the contact patch appears to limit, at least locally, the engagement of one wall of an incision with the other wall. This limiting of the engagement of the walls of the incision is detrimental to grip and torque transfer properties.

The combination of incision lengths less than 1.2 times the width of the surface of the contact patch with at least one incision that has at least one end ending in a cut in the tread of which the width is greater than 2.5 mm appears to encourage engagement of the walls of the incisions and lead to superior grip properties.

According to one preferred embodiment of the invention, the apparent area of the incisions is greater than the apparent area of the cuts in the tread the width of which is greater than 2.5 mm and the length of which is between 2.5 and 10 mm.

Within the meaning of the invention, the apparent area of a cut is the area of the void or of the region devoid of material delimited by the walls of the said cut on the surface of the tread. It is measured on a tire that is inflated to the nominal pressure and unladen.

For preference also, the apparent area of all the cuts in the tread of which the width is greater than 2.5 mm and of which the length is between 2.5 and 10 mm is less than 75% of the apparent area of all the incisions.

According to a preferred embodiment of the invention, the length of the incisions is less than the width of the surface of the contact patch.

According to an embodiment the invention, at least one end of at least one incision ends either in a groove as described earlier which delimits the blocks of rubber compound that form the tread or in a cut provided specifically for that purpose.

Such a cut provided specifically for that purpose is, for example, a cut of a depth substantially equal to that of the incision.

Advantageously also according to an embodiment the invention, these cuts provided specifically have a cross section of oval type at the tread.

According to other embodiments, the cross section at the surface of the tread of these cuts provided specifically can be of any geometric shape, such as polygons for example.

Advantageously also, each of the cuts provided specifically and having a width greater than 2.5 mm has a length of between 2.5 and 10 mm, and more preferably still of less than 5 mm. The length of a part is measured between the two ends of incisions that they connect; it is equal to the length of the rectangle circumscribing the said part, as defined earlier.

According to another alternative form of embodiment of the invention, the ends of an incision of which the length is greater than 0.7 times the width of the surface of the contact patch end in a cut in the tread of which the width is greater than 2.5 mm.

Such cuts in the tread are, as in the case of the first alternative form of embodiment of the invention, either a groove or a cut provided specifically for that purpose.

One advantageous alternative form of the invention is for the depth of the incisions to vary in the axial direction notably to take account of different rates of wear in the axial direction of the tire and to obtain tread rigidities that vary in the axial direction.

According to one advantageous embodiment of the invention, at least the surface of the tread consists of a first polymer compound extending over at least part of the central part and of at least one second polymer compound having physico-chemical properties different from those of the said first polymer compound and covering at least part of the axially external parts of the tread.

Such an alternative form of the invention makes it possible to create a tread which, for example, has improved wear properties at the center of the tread and improved grip properties on the axially external parts.

Such an alternative embodiment of the invention notably proposes for a tread having improved wear properties to coincide with the presence of incisions, thus making it possible to maintain satisfactory grip properties in combination with improved wear properties.

According to one advantageous embodiment of the invention, in order to give the tire symmetric properties, the central circumferential band is advantageously centered on the equatorial plane. In other embodiments, intended for example for tires intended to run on a circuit in which all the bends are essentially in the same direction, it is possible for the central circumferential band not to be centered on the equatorial plane.

Advantageous alternative embodiments of the invention may foresee the presence of five or more circumferential bands to form at least the surface of the tread and thus provide a gradual evolution in the properties of the said tread from the equatorial plane out towards the shoulders. As before, such an embodiment may be symmetric with respect to the equatorial plane or non-symmetric, the distribution of the bands differing in terms of their composition or in terms of their distribution about the equatorial plane.

According to a preferred embodiment of the invention, the second polymer compound is of a composition different from that of the first polymer compound and, more preferably still, the second polymer compound has grip properties superior to those of the said first polymer compound.

According to other embodiments, different properties can be obtained with identical compounds but using different vulcanizing conditions.

Advantageously also, the radial thicknesses of the first and second polymer compounds may differ, so as to optimize tread wear in the axial direction. Advantageously also, the thicknesses vary gradually.

According to one preferred embodiment of the invention, the second polymer compound has a Shore A hardness different from that of the first polymer compound.

The Shore A hardness of the polymer compounds after curing is assessed in accordance with the ASTM D 2240-86 standard.

According to one preferred embodiment of the invention, the reinforcing elements of the carcass-type reinforcing structure make with the circumferential direction an angle of between 65 and 90°.

According to a variant of the invention, the crown reinforcing structure comprises at least one layer of reinforcing elements that make with the circumferential direction angles of between 10 and 80°.

According to this alternative form, the crown reinforcing structure advantageously comprises at least two layers of reinforcing elements, the reinforcing elements between them making angles of between 20 and 160°, from one layer to the next, preferably angles in excess of 40°.

According to one preferred embodiment of the invention, the reinforcing elements of the working layers are made of textile material.

According to another embodiment of the invention, the reinforcing elements of the working layers are made of metal.

In one advantageous embodiment of the invention, notably with a view to optimizing the rigidities of the reinforcing structure along the meridian of the tire, and in particular at the edges of the working layers, the angles made by the reinforcing elements of the working layers with the longitudinal direction can vary in the transverse direction such that the said angles are greater on the axially external edges of the layers of reinforcing elements by comparison with the angles measured at the equatorial plane of the tire.

One embodiment of the invention has the tire notably consisting of a crown reinforcing structure which comprises at least one layer of circumferential reinforcing elements; according to the invention, the layer of circumferential reinforcing elements consists of at least one reinforcing element oriented to make an angle less than 5° with the lower longitudinal direction.

For preference also, the reinforcing elements of the layer of circumferential reinforcing elements are metal and/or textile and/or glass. The invention notably foresees the use of reinforcing elements of different kinds within one and the same layer of circumferential reinforcing elements.

For preference also, the reinforcing elements of the layer of circumferential reinforcing elements have an elastic modulus higher than 6000 N/mm$^2$.

One alternative embodiment of the invention advantageously has it that the circumferential reinforcing elements are distributed in the transverse direction at a variable pitch.

The variation in the pitch between the circumferential reinforcing elements takes the form of a variation in the number of circumferential reinforcing elements per unit length in the transverse direction and therefore of a variation in the density of circumferential reinforcing elements in the transverse direction and hence of a variation in circumferential rigidity in the transverse direction.

BRIEF DESCRIPTION OF THE DRAWINGS

Further details and advantageous features of the invention will become more clearly apparent hereinafter from the description of the embodiments of the invention given with reference to the following drawings.

DETAILED DESCRIPTION OF THE DRAWINGS

Figure 1:
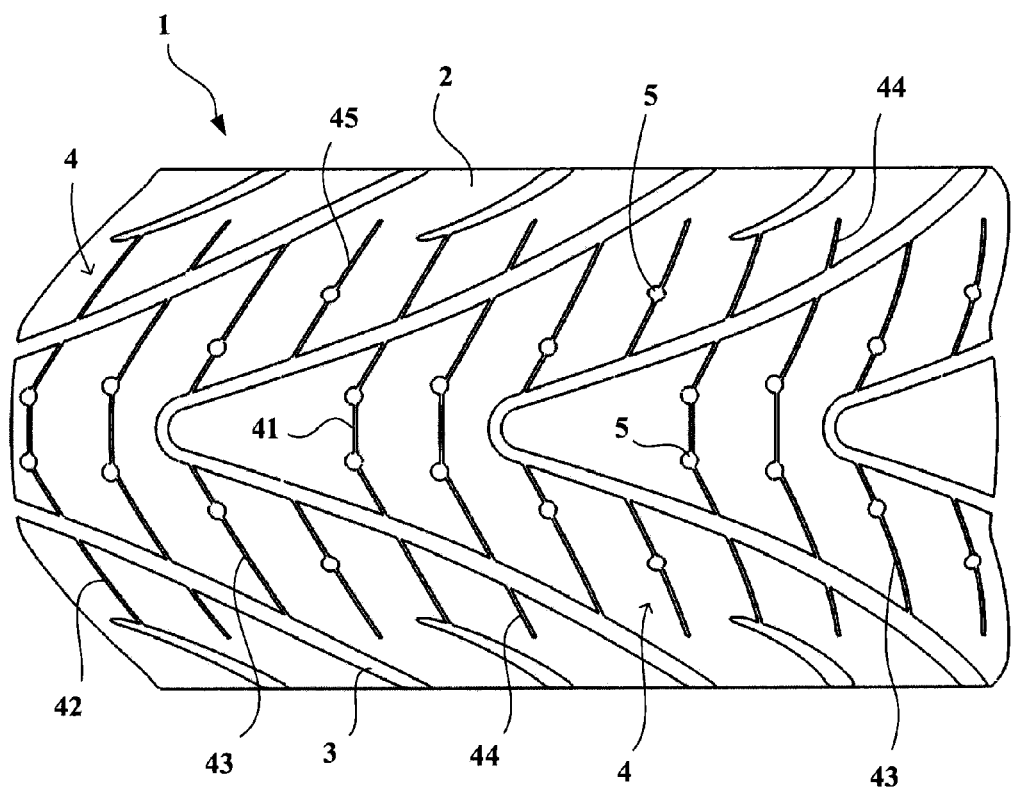
FIG. 1 is a partial view from above of a diagram of a tire according to a first embodiment of the invention.
Figure 2:
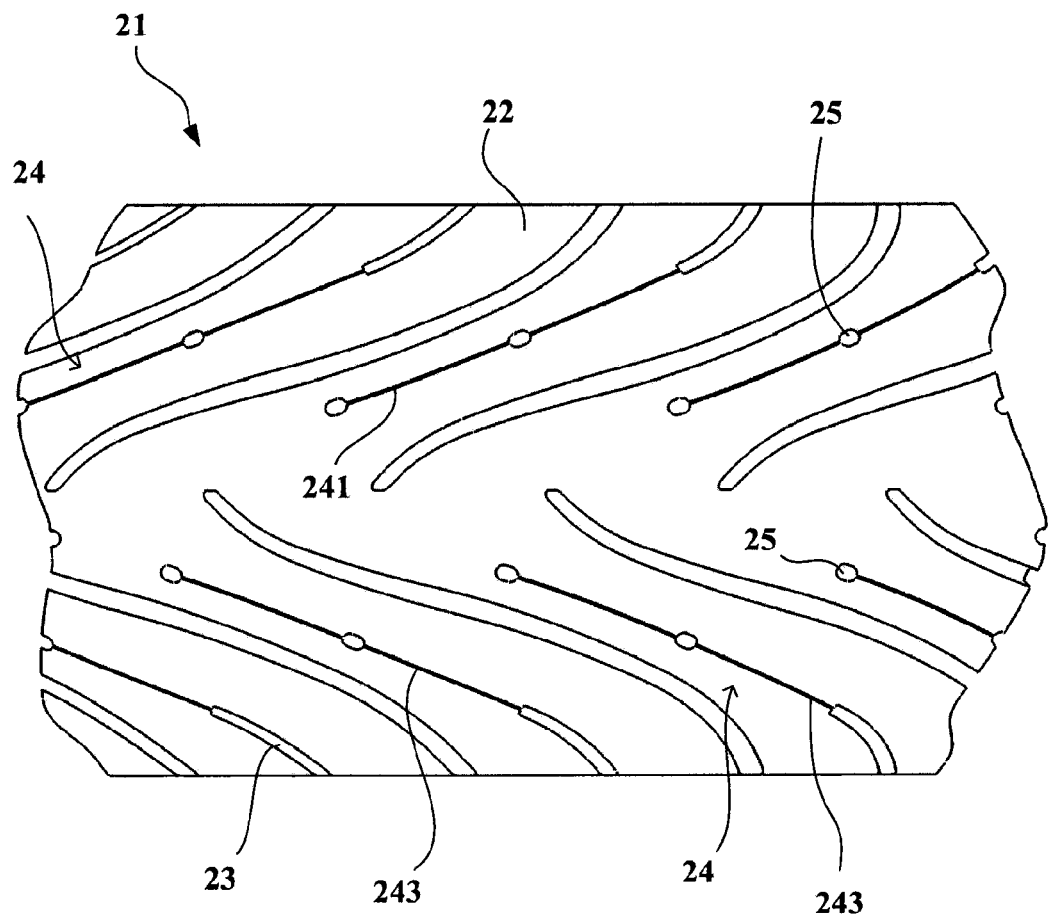
FIG. 2 a partial view from above of a diagram of a tire according to a second embodiment of the invention.

In order to make them easier to understand, FIGS. 1 and 2 are not drawn to scale.

FIG. 1 depicts a partial perspective view of a tire 1, and more specifically of the external surface 2 of the tread thereof, intended to be fitted to the front wheel of size 120/70 ZR 17 of a motorbike. The tire 1 has a curvature in excess of 0.15 and preferably in excess of 0.3. The curvature is defined by the ratio Ht/Wt, which means the ratio of the height of the tread to the maximum width of the tread of the tire.

In a way which has not been depicted in the figures, the tire 1 comprises a carcass reinforcement consisting of a layer comprising reinforcing elements of textile type. The layer consists of reinforcing elements laid radially. The radial positioning of the reinforcing elements is defined by the angle at which the said reinforcing elements are laid; a radial arrangement corresponds to the said elements being laid with respect to the longitudinal direction of the tire at an angle of between 65 and 90°.

The carcass reinforcement is anchored on each side of the tire 1 in a bead the base of which is intended to be mounted on a rim seat. Each bead is extended radially outwards by a side wall, the side wall radially towards the outside joining to the tread.

The tire 1 further comprises a crown reinforcement consisting for example of two layers of reinforcing elements making angles with the circumferential direction, the said reinforcing elements being crossed from one layer to the next making between them angles for example of 50° in the region of the equatorial plane, the reinforcing elements of each of the layers making an angle of, for example, 25°, with the circumferential direction.

The crown reinforcement may even consist of a layer of circumferential reinforcing elements instead of the layers of reinforcing elements that make angles with the circumferential direction or alternately in combination therewith.

The tread 2 of the tire 1 comprises a tread pattern consisting of grooves 3, the main direction of these being at a slight angle to the radial direction in order to give the said tread pattern a direction.

The tread 2 also has incisions 4 distributed across the width of the tread.

According to the invention, most of the ends of the incisions 4 open either into grooves 3 or into cuts of which the width is greater than that of the incisions, it being possible for these cuts to be qualified as wells 5. In the case of FIG. 1, these wells 5 have an oval shape on the surface of the tread 2.

On the surface of the tread there are incisions 41 each of the ends of which end in a well 5. There are other incisions 42 each of the ends of which ends in a groove 3. There are incisions 43 of which one end ends in a well 5 and the other in a groove 3. There are also incisions 44 of which one end ends in a groove 3 and of which the other end is closed by a mass of rubber of the tread and incisions 45 of which one end ends in a well 5 and of which the other end is closed by a mass of rubber of the tread.

As explained earlier, the connections with the grooves 3 or with the wells 5 are advantageously designed to interrupt the incisions and thus create incisions of which the length is less than 1.2 times the width of the contact patch.

In the case of the tire 1, the width of the contact patch as measured under the conditions set out hereinabove, which means to say under a load of 1390 Newtons and pressure of 2.5 bar, with the tire mounted on a 3.50 MT 17 rim is 47 mm.

The lengths of the incisions 41, 42 and 43 are between 10 and 31 mm and therefore less than the width of the tread according to the invention.

The lengths of the incisions 44 and 45 are between 17 and 24 mm and therefore less than 0.7 times the width of the tread; according to the invention, incisions of such lengths may have a non-open end.

The apparent area of all of the incisions 4 of the tire is equal to 5245 mm$^2$.

The apparent area of all of the wells 5 of the tire is equal to 2000 mm$^2$.

According to the invention, the apparent area of all of the incisions 4 is greater than the apparent area of all of the wells 5.

FIG. 2 depicts a partial view from above of a tire 21 and more specifically of the surface of the tread 22 of the said tire 21 intended to be fitted to a rear wheel of a motorbike. This is a tire of the 180/55 ZR 17 size.

The grooves 23 are extended by a succession of incisions 24 separated by wells 25.

In this FIG. 2 there are incisions 241 each of the ends of which ends in a well 25 and incisions 243 one end of which ends in a well 25 and the other in a groove 3. In this example illustrated in FIG. 2 there are no incisions of which one end is closed by a mass of rubber of the tread.

In the case of the tire 21, the width of the contact patch as measured under the conditions set out hereinabove, namely under a load of 2150 Newtons and a pressure of 2.5 bar, with the tire mounted on a 5.50MT17 rim, is 70 mm.

The lengths of the incisions 241 and 243 are substantially equal and are in the range between 54 and 56 mm and are therefore less than the width of the tread according to the invention.

The apparent area of all of the incisions 24 of the tire is equal to 7194 mm$^2$.

The apparent area of all of the wells 25 of the tire is equal to 4320 mm$^2$.

According to the invention, the apparent area of all of the incisions 24 is greater than the apparent area of all of the wells 25.

Tests were carried out with a tire of 120/70 ZR 17 size produced according to FIG. 1.

This tire was compared against two reference tires identical to the tire of the invention and having the same grooves. The first reference tire R1 had no incisions.

Reference tire R2 had the same incisions as the tire according to the invention, but no wells.

The tests involved three riders running the tires on a wetted circuit. The results are the average of the times achieved by each rider over six laps, the time for the first lap being disregarded.

The value of 100 was assigned to reference tire R1.

Reference tire R2 scored 115 which already demonstrates the benefit of the presence of incisions on the tread.

The tire according to the invention achieved a score of 120. This last result confirms that shorter incisions notably obtained through the presence of wells and of which at least one end ends in a cut in the tread with a greater width further improves grip performance.

The invention claimed is:

1. A tire for a motorized two-wheeled vehicle comprising:
   a reinforcing structure of the carcass type, made up of reinforcing elements, anchored on each side of the tire to a bead the base of which is adapted to be mounted on a rim seat,
   each bead being extended radially outward by a sidewall, the sidewalls radially toward the outside joining to a tread comprising incisions,
   wherein a length of each incision is less than 1.2 times a width of a surface of the contact patch and
   wherein at least one incision has at least one end which ends in a cut in the tread the width of which is greater than 2.5 mm and the length of which is between 2.5 and 10 mm,
   wherein an apparent area of the incisions is greater than the apparent area of the cuts in the tread the width of which is greater than 2.5 mm and the length of which is between 2.5 and 10 mm,
   wherein the apparent area of the cuts in the tread of which the width is greater than 2.5 mm and of which the length is between 2.5 and 10 mm is less than 75% of the apparent area of the incisions, and
   wherein at least 50% of the respective ends of the incisions terminate in a cut in the tread of which the width is greater than 2.5 mm, and
   wherein the ends of an incision of which the length is greater than 0.7 times the width of the area of the contact patch end in a cut in the tread of which the width is greater than 2.5 mm.

2. The tire according to claim 1, wherein the length of the incisions is less than the width of the area of the contact patch.

3. The tire according to claim 1, wherein the length of said cut in the tread of which the width is greater than 2.5 mm is less than 5 mm.

4. The tire according to claim 1, the tread comprising at least one central part and two axially external parts, wherein at least the surface of the tread consists of a first polymer compound extending over at least part of the central part and of at least one second polymer compound having physico-chemical properties different from those of the said first polymer compound and covering at least part of the axially external parts of the tread.

5. The tire according to claim 1, wherein the reinforcing elements of the carcass-type reinforcing structure make with a circumferential direction an angle of between 65 and 90°.

6. The tire according to claim 1, wherein the crown reinforcing structure comprises at least one layer of reinforcing elements, known as the working layer, and wherein the reinforcing elements make with a circumferential direction angles of between 10 and 80°.

7. The tire according to claim 6, wherein the angles made by the reinforcing elements of the said at least one working layer with the longitudinal direction can vary in the transverse direction.

8. The tire according to claim 1, wherein the crown reinforcing structure comprises at least one layer of circumferential reinforcing elements.

9. The tire according to claim 8, wherein the circumferential reinforcing elements are distributed in the transverse direction at a variable pitch.

10. The tire according to claim 1, wherein at least one incision has at least one end which does not end in a well or a cut in the tread the width of which is greater than 2.5 mm and the length of which is between 2.5 and 10 mm.

* * * * *